No. 688,291. Patented Dec. 10, 1901.
W. J. BUCKLEY.
ELECTRIC STORAGE BATTERY OR ACCUMULATOR.
(Application filed Sept. 1, 1900.)
(No Model.) 2 Sheets—Sheet 1.
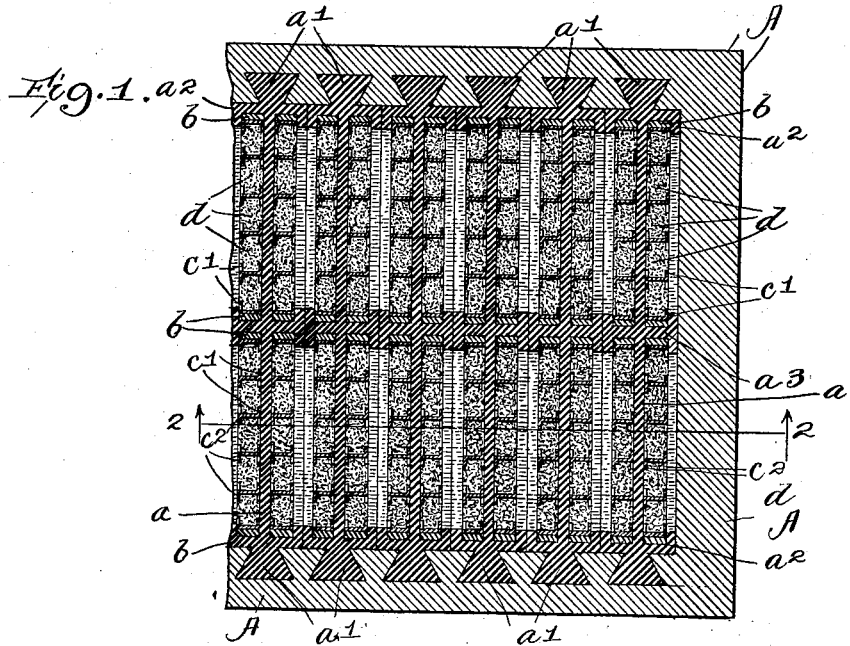
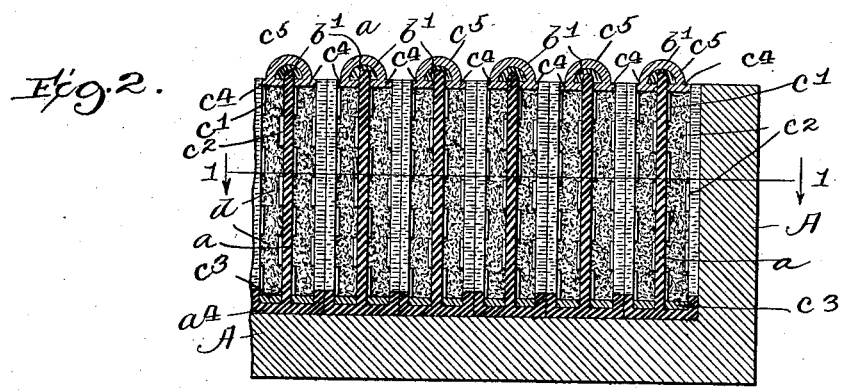
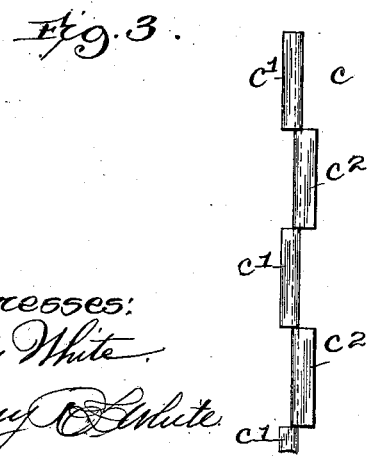
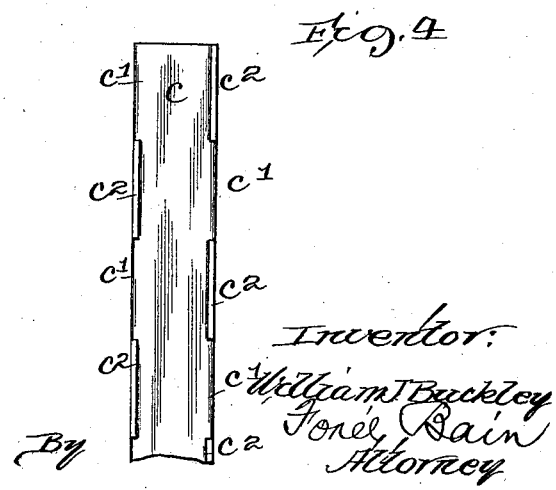

No. 688,291. Patented Dec. 10, 1901.
W. J. BUCKLEY.
ELECTRIC STORAGE BATTERY OR ACCUMULATOR.
(Application filed Sept. 1, 1900.)
(No Model.) 2 Sheets—Sheet 2.
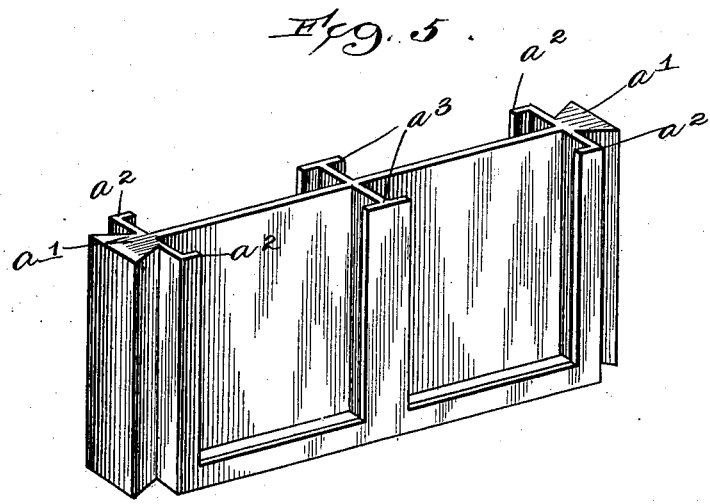
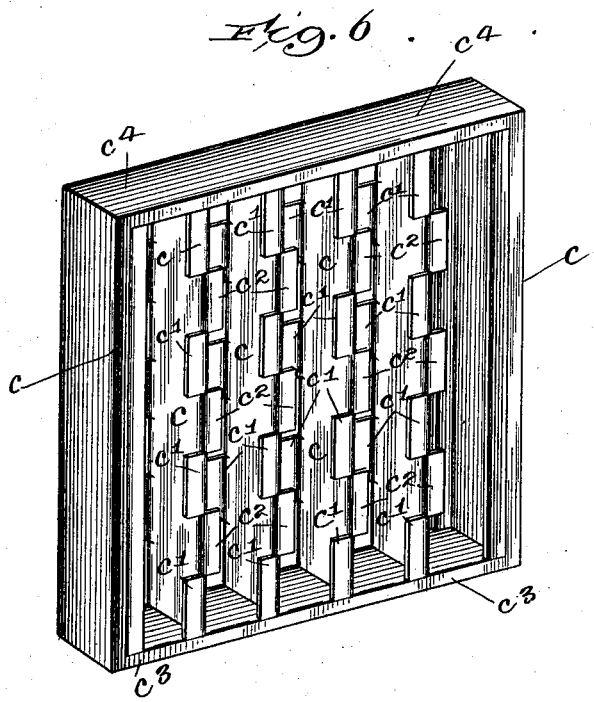
Witnesses:
Ray White
Harry B. L. White
Inventor:
William J. Buckley
By Foree Bain
Attorney.

UNITED STATES PATENT OFFICE.

WILLIAM J. BUCKLEY, OF CHICAGO, ILLINOIS.

ELECTRIC STORAGE BATTERY OR ACCUMULATOR.

SPECIFICATION forming part of Letters Patent No. 688,291, dated December 10, 1901.

Application filed September 1, 1900. Serial No. 28,723. (No model.)

*To all whom it may concern:*

Be it known that I, WILLIAM J. BUCKLEY, a citizen of the United States, residing in Chicago, county of Cook, and State of Illinois, have invented certain new and useful Improvements in Electric Storage Batteries or Accumulators; and I do hereby declare the following to be a full, clear, and exact description, such as will enable persons skilled in the art to which it appertains to make and use the same.

My invention relates to improvements in electric storage batteries or accumulators, more particularly to that class of batteries wherein the active plates or elements are placed in the excitant or electrolyte in such a way that the electromotive force of each pair or couple of plates will be added to that of its neighboring couple or pair and in which the electromotive force of the associated couples will be cumulative, such a type of battery being commonly known in the art as "high-tension" batteries.

One of the objects of my invention is to provide a single liquid-containing receptacle for all of the couples or plates, the said receptacle being divided by mechanical partitions, providing cells in the said receptacle for an electrolyte to be contained therein between the said partitions for each couple that is to be placed within each cell thus provided.

Another object of my invention is to provide a plate or element which may be folded upon itself, the opposite ends of the said plate being contained in separate cells of the series, the opposite ends of the said plate being active on both sides, each end opposingly active to the other—that is to say, one end of the said plate will constitute the negative element of one cell while the other end of the same plate will constitute the positive element of the adjoining cell.

A further object of my invention is to provide a partition by which the electrolyte in the said receptacle is mechanically separated, forming cells in which the elements of the said battery are to be contained, the said partitions being arranged so as to hold the plate or element by preserving its concrete form while the said plate or element is contained within the said receptacle, or, in other words, the partition is a means by which the active surfaces and the contiguous conducting portions of the plate are held in a concrete condition in lieu of the ordinary metallic frame usually employed for this purpose and which is heavy and unnecessary in my construction.

In the drawings, Figure 1 represents a plan view of a fragment of a receptacle, showing a series of my plates and mechanical partitions regularly arranged therein. Fig. 2 is a section through line 2 2 of Fig. 1. Fig. 3 is an edged view of one of the vertical metallic conducting bars or strips, of which there are a number, which constitute the grid or the metallic portion of the element. Fig. 4 is a side view of the said bar or strip. Fig. 5 is an enlarged perspective view of the partition with the attached frame removed from the receptacle. Fig. 6 is a still larger perspective view of the grid without the active material.

In all of the figures the same letters of reference are used to indicate similar parts.

A represents a box or receptacle, that may be of wood, properly treated, or any other electrical insulator or non-conductor of electricity, provided with vertical grooves, in which the dovetailed extension $a'$ of the partition $a$ is adapted to fit. The partition $a$ is composed, preferably, of ebonite or similar material and is provided at either end with the dovetailed extension $a'$. The partition is also provided at either end and in the middle with lateral projections having parallel extensions $a^2$ and $a^3$ fixed thereto, thus forming a frame into which the active element is adapted to be inserted. The frame is a little wider than the element, so it may contain soft-rubber strips $b$. These strips being elastic a means is thereby provided for taking up the expansion of the element which results when it is being charged or discharged. The partitions being made of wood, treated to render it non-porous and unaffected by the electrolyte, or ebonite or similar light electric insulating material form partitions between the adjoining cells and at the same time afford a means by which the plate may be held in position and also may be held bodily to prevent it from becoming broken up or disintegrated.

In constructing the plates a series of thin lead strips $c$ are placed vertically and parallel between similar longitudinal strips $c^3$ and $c^4$. The former strips are preferably burned or otherwise joined to the latter, and in this manner a metallic frame is formed. Between these strips the active material is to be included. For the purpose of retaining the active material between the strips the edges of the said strips are turned over, as shown at $c'$ and $c^2$ in Figs. 3 and 4. The strips contained at the ends of this frame I prefer to turn all of the edges inwardly instead of turning a portion inwardly and outwardly alternately, which I do with the strips that are contained intermediate of the two end strips. This is shown more plainly in Fig. 1. After the metal frames have been made in the manner described the active material is placed between the adjoining strips and the elements or plates are thus produced. It is then placed in a partitioned frame between the projections $a^2$ and $a^3$, one plate being placed on either side of said partition. A U-shaped lead strip $c^5$ is placed across the top of the partition $a$ and is burned or otherwise attached to the longitudinal top metallic surface of the plate or element $c^4$, as shown by the dividing line in Fig. 2. To complete the connection between the cells, the plates are placed on either side of the same partition and connected above said partitions.

It is of course obvious that the plate may be constructed so that it could be bent around upon itself in order that one extremity or end of the said plate may be located on one side of the partition $a$ and placed in the frame, as shown, and the other end of the said plate may be made to slide into the frame on the other side of the partition; but the use of this U-shaped connecting-piece I have found much more convenient. For the purpose of forming a cushion for the said plate, so that it will not be affected by concussion or jars of a vehicle, for instance, I prefer to first place over the top of the partition $a$ a rubber sheet $b'$, which is interposed between the top of the said partition and the U-shaped lead joining-piece $c^5$. The joining-piece $c^5$ connects the positive plate of one cell with the negative plate in the adjoining cell and is a means for preserving the electrical continuity of the battery, so that the electromotive force of the series of couples contained therein may be by this means connected in series.

As a result of the construction which I have shown and described a very light battery may be made.

The conducting-strips contained within the element plate are placed vertically, so as to provide an electric conducting path directly from each and every part of the active material to the next succeeding plate through the connecting-strip over the top of the said plate, and therefore the very smallest amount of metal necessary to conduct the current from the active surface thereof may be employed, and inasmuch as the plate is bodily supported and held in place and in position by means of a non-metallic supporting-frame a surrounding metallic frame usually employed for this purpose becomes unnecessary. The resilience of the rubber strip $b$ causes all of the parts of the plate to go back into their original position when they have departed therefrom by the act of expanding.

I do not limit my invention to the form of grid shown and described. I have shown this grid for the purpose of illustrating a means by which the very smallest amount of metal may be employed for the purpose of constructing an element of storage battery when the said element is held bodily in position by a light surrounding frame and does not depend upon a surrounding conducting-frame of metal for its support.

Having described my invention, what I claim as new, and desire to secure by Letters Patent of the United States, is—

1. In a high-tension battery a receptacle for a series of electrically-active elements, an excitant, or electrolyte, in said receptacle, partitions dividing said receptacle into cells, elements of said battery placed on either side of said partition, connections joining said elements above said partition, and a soft resilient cushion for supporting said elements, substantially as set forth.

2. In a high-tension battery, a receptacle for a series of electrically-active elements, an excitant, or electrolyte, in said receptacle, partitions dividing said receptacle into cells, a frame within said cell fixed around the sides and bottom of said partitions for holding said elements, and elements in said frames, substantially as set forth.

3. In a battery an element comprising a series of parallel, vertical, electric conductors, active material interposed between said conductors, a detachable frame surrounding said element, and a resilient medium between said frame and said element, substantially as set forth.

4. In a battery an element comprising a series of parallel, vertical, electric conductors, active material interposed between said conductors, a frame for containing two of said elements, comprising a partition, a means fixed to each side of said partition, for intimately supporting the sides and bottom edges of said elements, and an electric connection joining said elements above said partition, substantially as set forth.

5. In a battery comprising a receptacle containing a series of partitions whereby cells are provided therein, two elements of said battery, one on either side of each partition, electrically joined together, and a cushion of insulating, resilient material, between the said partitions, and the joint connecting said elements, upon which said elements are carried, substantially as set forth.

In testimony whereof I have signed this specification, in the presence of two subscribing witnesses, this 25th day of August, A. D. 1900.

WILLIAM J. BUCKLEY.

Witnesses:
JAMES K. KUMPELLY,
M. F. ALLEN.